Figure 1:
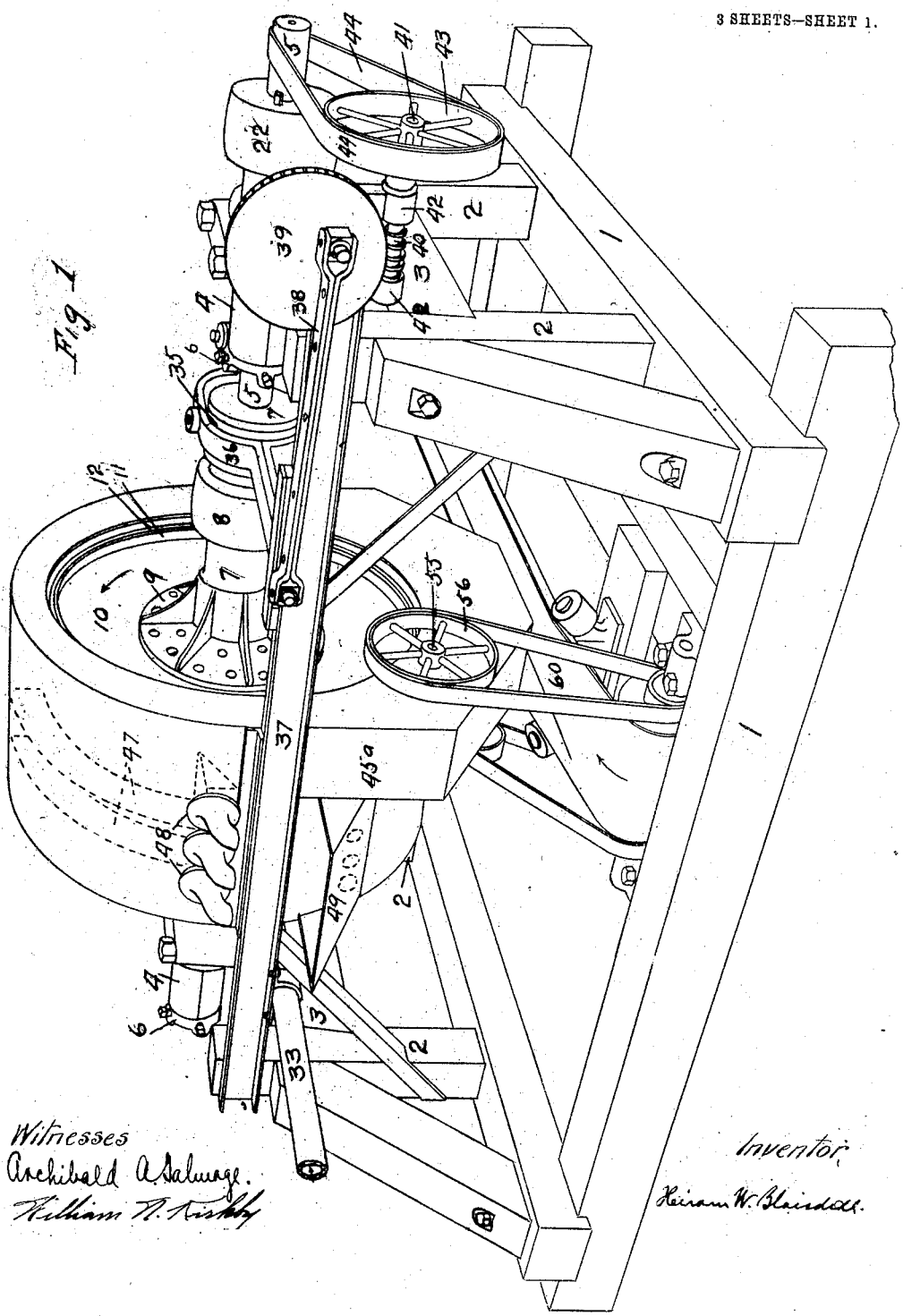

No. 866,424. PATENTED SEPT. 17, 1907.
H. W. BLAISDELL.
CENTRIFUGAL FILTER.
APPLICATION FILED MAY 17, 1905.

3 SHEETS—SHEET 1.

Witnesses
Archibald A. Salmage.
William N. Rishly

Inventor
Hiram W. Blaisdell.

No. 866,424. PATENTED SEPT. 17, 1907.
H. W. BLAISDELL.
CENTRIFUGAL FILTER.
APPLICATION FILED MAY 17, 1905.
3 SHEETS—SHEET 2.
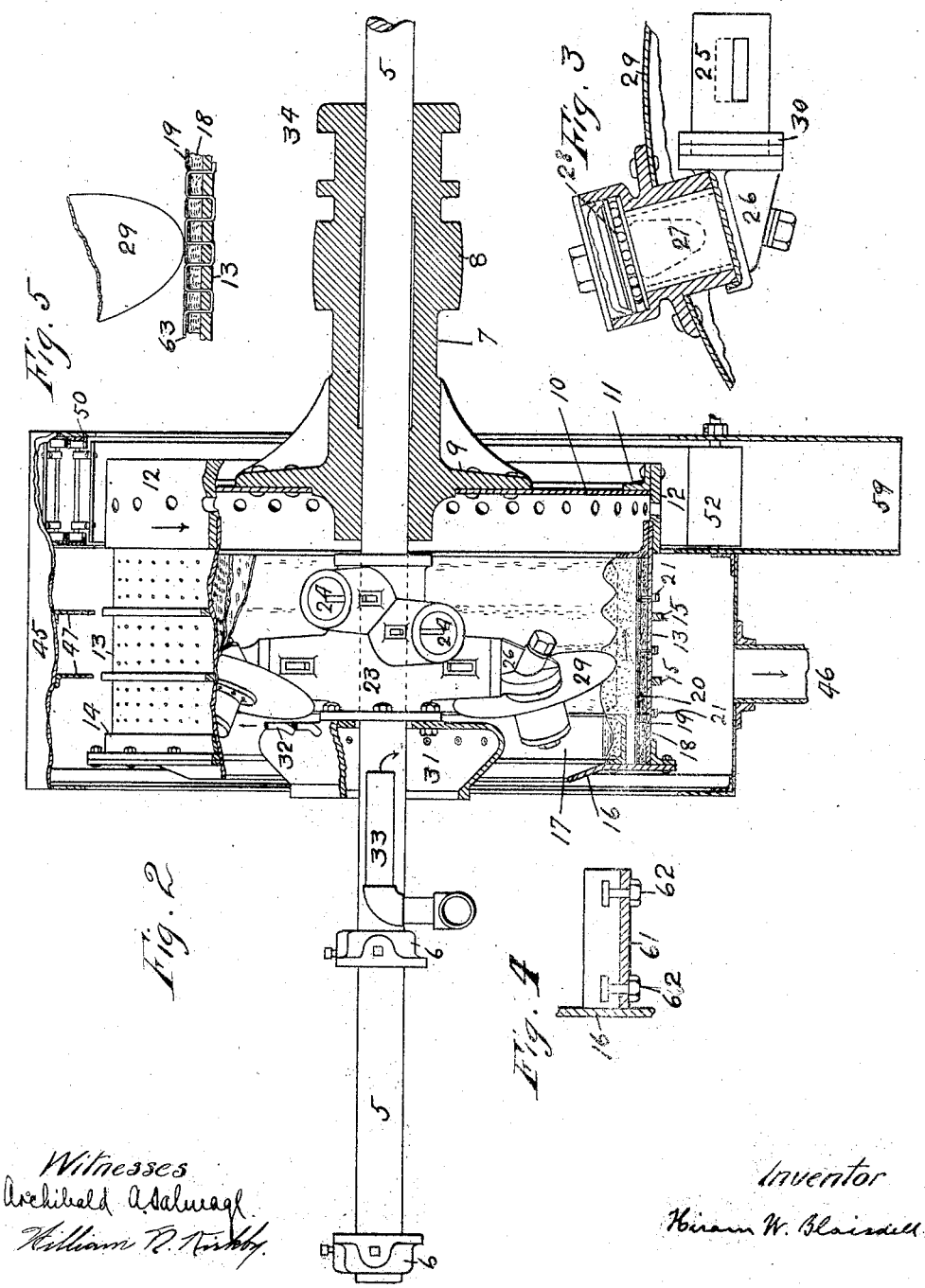

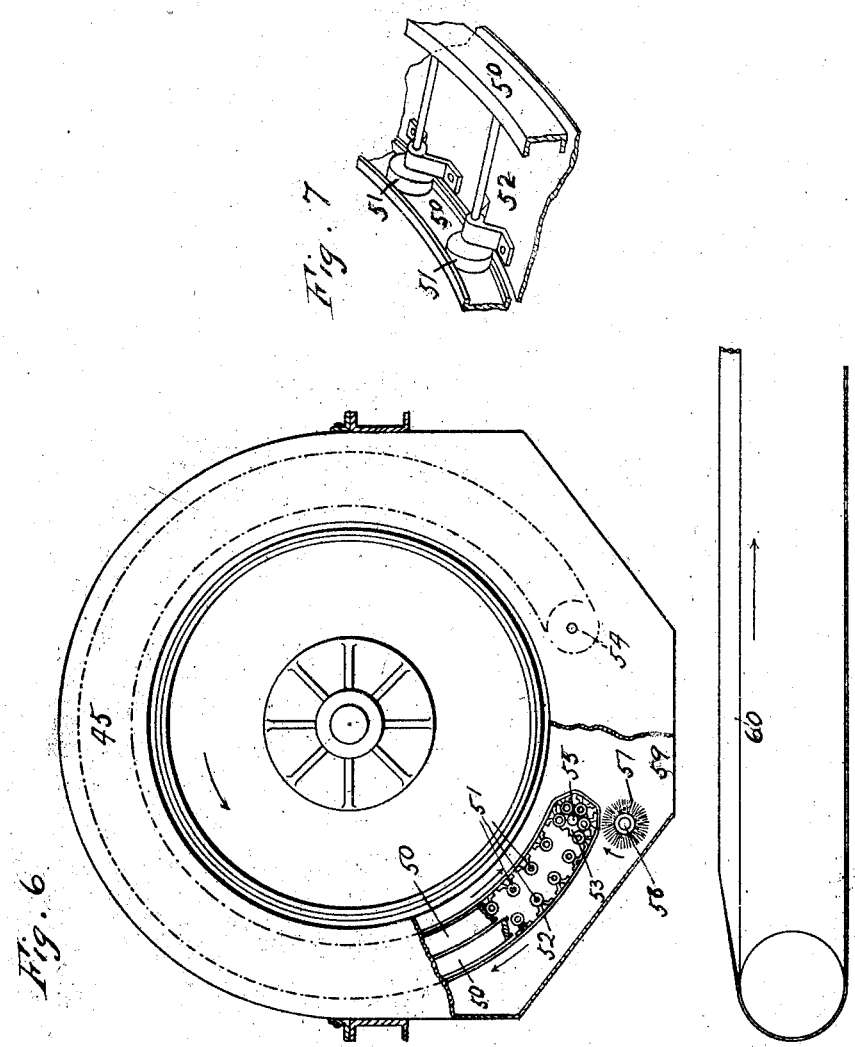

UNITED STATES PATENT OFFICE.

HIRAM W. BLAISDELL, OF LOS ANGELES, CALIFORNIA.

CENTRIFUGAL FILTER.

No. 866,424.　　　　　Specification of Letters Patent.　　　　Patented Sept. 17, 1907.

Application filed May 17, 1905. Serial No. 260,894.

*To all whom it may concern:*

Be it known that I, HIRAM W. BLAISDELL, a citizen of the United States, residing at Los Angeles, in the county of Los Angeles and State of California, have invented certain new and useful Improvements in Centrifugal Filters; and I do hereby declare the following to be a full, clear, and exact description of the invention, such as will enable others skilled in the art to which it appertains to make and use the same.

This invention relates to centrifugal filters, and has for its object to provide an apparatus that shall be capable of economical and continuous operation without the necessity of stoppage to replenish it with the substance under treatment or for the purpose of discharging either the filtrate or residuum.

It is also an object of this invention to effect the separation of water from sand and slimes as they come from a crushing apparatus, thereby delivering said sand and slimes in a well-mixed condition for subsequent treatment by cyanid or other process for the extraction of the precious metals.

Another object of the invention is to provide a machine in which the filter bed may be formed wholly or in part of the substance which it is desired to filter.

These, and other, objects are attained by means of the mechanism described in the following specification and illustrated in the accompanying drawings, in which Figure 1 is a perspective, general view of my apparatus; Fig. 2 is a longitudinal section through the rotating parts and the case surrounding them; Fig. 3 is a detail of the bearing of one of the rotating disks; Fig. 4 is an alternative construction of the cushion to receive the impact of the material as it passes to the filter bed; Fig. 5 is a sectional view of a portion of the filtering surface, showing an alternative construction; Fig. 6 is an end view of the case, partly broken away, showing the means for removing the residuum therefrom; Fig. 7 is a perspective detail of a portion of the belt shown in Fig. 6.

Referring to Fig. 1, the character 1 designates the sills of the apparatus, upon which are mounted uprights 2, carrying cross pieces 3, which support bearings 4, in which rotates shaft 5, held from longitudinal motion by collars 6, set-screwed thereon, and rotatably and slidably mounted on shaft 5 is a sleeve 7, having a pulley 8, which may be driven from a countershaft, not shown.

On one end of the sleeve 7 is a flange 9, to which may be riveted a plate 10, around the edge of which may be riveted an angle bar 11, Figs. 1 and 2, to which is fixed a perforated ring 12. On the opposite side of the ring 12, from plate 10, is a drum 13, having an angle piece 14, on its opposite end and reinforcing rings 15, in the middle. Bolted to angle 14 is a cover plate 16, which carries the channel ring 17. The drum 13 is perforated and is preferably lined with a layer of fibrous material 18, and one of canvas or similar fabric 19, the latter being held down by narrow strips of iron or other metal 20, spaced equidistantly around the inner drum 13, and held in place by bolts 21.

Shaft 5 has a pulley 22, Fig. 1, adapted to be driven from the same counter-shaft as pulley 8, but at a lower speed. Rigidly mounted on shaft 5 and within the drum 13, is a spider 23, having sockets 24, into which are keyed the projections 25, of the disk supporters 26, preferably provided with a cavity for the purpose of holding lubricating substances, which have bearings 27, provided with anti-friction thrust devices 28, on which are mounted disks 29, which may be concavo-convex in form.

Projection 25 may be provided with collars or washers 30 by means of which the disk 29 may be adjusted to any desired distance from the surface of the filtering fabric 19. Sockets 24 are in three different vertical planes. On one side of spider 23 is bolted a bowl 31, provided with outlet tubes 32, these being omitted where they come opposite to the bearings of any of the disks.

A pipe 33 is arranged to deliver the material to be filtered into the bowl 31, Figs. 1 and 2.

The sleeve 7 has at one end a groove 34, Fig. 2, adapted to receive block 35 in the center of the lever 36, one end of which lever is pivoted to one of the channel bars 37, and the other end, connected by means of a pitman 38, to a crank disk 39, having teeth on its periphery adapted to be engaged by a worm 40, mounted on the shaft 41, which is supported in bearing 42, and carries a pulley 43, around which and the shaft 5, passes the belt 44. By these means, a reciprocating motion may be communicated to the sleeve.

The drum 13 may be provided with a case 45, with an outlet 46, and sampling vanes 47 and sampling spouts 48, underneath which is a trough 49 with openings communicating with the lower part of case 45. That portion of the case surrounding the ring 12 may have mounted in it channel bars 50, Figs. 2, 6 and 7, in which travel rollers 51, supporting an endless belt 52, which travels over sprocket wheels 53 and 54, mounted in bearings in said case, in the direction indicated in Fig. 6.

Sprocket 53 is mounted on shaft 55, which carries a pulley 56, which may be driven from any suitable source of power. Mounted below sprocket 53 is a rotary brush 57, mounted on shaft 58, and driven in the direction indicated in Fig. 6, by any suitable means. The portion 45ª of the casing has an opening 59 in its lower part, beneath which may travel an endless conveyer belt or similar apparatus 60.

Referring to Fig. 4, there is shown a construction which may be substituted for the channeled ring 17. It consists of a ring of metal 61, to which is affixed by means of bolts 62, the heads whereof are embedded therein, a ring of rubber or other elastic material.

Referring to Fig. 5, there is shown an alternative method of holding the fiber lining and the filtering fabric in place. This consists of a wire 63, which may pass through holes in the drum 13, and through the fabric, after the manner of sewing.

The method of operation of this apparatus is as follows: The machine being in rotation, the material to be filtered, which may consist of the sand and slimes, before mentioned, the pulp from beet sugar manufacture or similar product, is led to the machine through the pipe 33 and empties into the bowl 31, and is driven by centrifugal force through the tubes or orifices 32 therein to the cushion formed on the channel ring 17, and wiers over the inner flange thereof on to the filter bed and is distributed and moved in the direction indicated by the arrow in Fig. 2, by being brought against the disks 29, through the slower rotation of the spider 25, said disks being inclined to the axis of shaft 5 as indicated. A predetermined portion, however, of the material, as indicated by the dotted line in Fig. 2, may be left undisturbed to form a filter bed. The reciprocating motion of the drum 13 and its appurtenances causes the disks 29 to cut the filter bed down to a level surface as indicated. The liquid portion of the material is driven by the centrifugal action through the filter bed, the canvas fabric and the fibrous material, and escapes through the perforations in drum 13 to the inside of the case 45, and escapes therefrom by the pipe 46, whence it may be conveyed to any desired place. The residuum is thrown by the last pair of disks on to the ring 12 and falls through the apertures therein on to the endless belt 53, which discharges it through the opening 59 of the case $45^8$ on to the belt 60 which conveys it to any preferred destination.

Referring to Fig. 2, when it is desired to clean the filter or repair or adjust any portion of it, within the drum 13, the bolts holding the ring 16 may be taken out and the ring 16 and the channel 17 may be removed through the opening in the case 45, giving free access to the interior of the filter.

Claims

1. A centrifugal filter having a hollow member, an inner member for distributing and removing material and means for giving the hollow member a reciprocating motion in relation to the inner member.

2. A centrifugal filter having a hollow member, an inner member carrying disks for distributing and removing material and means for giving the hollow member a reciprocating motion in relation to the inner member.

3. A centrifugal filter having an inner member, and disk holders helically arranged on said inner member around the axis thereof.

4. In a centrifugal filter, a disk-carrying inner member and means for radially adjusting said disks and means for giving said inner member a reciprocating motion.

In testimony whereof, I have signed my name to this specification, in the presence of two subscribing witnesses at Los Angeles, this 22nd day of April, 1905.

HIRAM W. BLAISDELL.

Witnesses:
MIGNON FORD,
HARRY A. BROOKS.